(12) United States Patent
Yamauchi et al.

(10) Patent No.: US 9,765,876 B2
(45) Date of Patent: Sep. 19, 2017

(54) BACKLASH ADJUSTING METHOD AND GEAR MECHANISM

(71) Applicant: OTICS CORPORATION, Nishio-shi, Aichi (JP)

(72) Inventors: Masafumi Yamauchi, Okazaki (JP); Takayoshi Ota, Okazaki (JP)

(73) Assignee: OTICS CORPORATION, Nishio-Shi, Aichi (JP)

( * ) Notice: Subject to any disclaimer, the term of this patent is extended or adjusted under 35 U.S.C. 154(b) by 234 days.

(21) Appl. No.: 14/290,461

(22) Filed: May 29, 2014

(65) Prior Publication Data

US 2014/0360297 A1     Dec. 11, 2014

(30) Foreign Application Priority Data

Jun. 6, 2013   (JP) ................................. 2013-119619

(51) Int. Cl.
*F16H 57/12*     (2006.01)

(52) U.S. Cl.
CPC ....... *F16H 57/12* (2013.01); *F16H 2057/125* (2013.01); *Y10T 74/19623* (2015.01)

(58) Field of Classification Search
CPC   F16F 15/265; F16H 1/2863; F16H 57/02004; F16H 57/12; F16H 57/023; F16H 2057/02021; F16H 2057/0222; F16H 2057/0225; F16H 2057/125; Y10T 74/19623; Y10T 74/18728;

(Continued)

(56) References Cited

U.S. PATENT DOCUMENTS 1,171,347 A * 2/1916 Morse ............... F16H 2007/081
                                                            384/91
1,262,924 A * 4/1918 Crippen .................. F16B 21/16
                                                            403/261

(Continued)

FOREIGN PATENT DOCUMENTS

JP        2006-207766 A     8/2006
JP        2010-261507 A     11/2010

OTHER PUBLICATIONS

Japanese Office Action for Application No. 2013-119619 dated Nov. 15, 2016 with English Translation (6 pages).

*Primary Examiner* — David M Fenstermacher
*Assistant Examiner* — Leonard J Archuleta
(74) *Attorney, Agent, or Firm* — Smith, Gambrell & Russell, LLP

(57) ABSTRACT

A gear mechanism includes a first gear, a second gear, an idler gear and a mover/stopper. The idler gear has an inner circumference with a centrally located inner space and an outer circumference rotatable relative to the inner circumference. The mover/stopper includes a bolt inserted through the inner space in a loosely fitted state and having a shaft part capable of assuming different radial positions relative to the inner space, and a receiving part holding the idler gear via the bolt. The idler gear and the bolt are configured such that the idler gear is allowed to be radially displaced relative to the bolt and to be tightened to the receiving part at a meshing engagement position by the bolt to be radially fixed and such that the inner circumference is allowed to be axially held between the receiving part and the bolt to be fixed.

11 Claims, 4 Drawing Sheets

(58) Field of Classification Search
CPC ..... Y10T 74/19898; Y10T 409/100636; Y10T 409/304592
USPC ...... 74/89.42, 397, 409, 440, 392, 339, 413; 490/5, 146; 464/73, 166, 102
See application file for complete search history.

(56) References Cited

U.S. PATENT DOCUMENTS

| | | | | |
|---|---|---|---|---|
| 2,860,015 A * | 11/1958 | Matterson | ............... | B61F 15/12 384/255 |
| 3,347,110 A * | 10/1967 | Wilson | ................ | F16H 57/12 403/259 |
| 4,610,645 A * | 9/1986 | Donn | ................ | F16H 7/1281 474/112 |
| 4,703,921 A * | 11/1987 | Cutburth | ............. | B23Q 1/4804 269/47 |
| 4,830,529 A * | 5/1989 | Bildtsen | ................ | F16M 7/00 403/4 |
| 4,831,975 A * | 5/1989 | Yoshimoto | ............... | F01L 1/02 123/90.27 |
| 5,540,112 A * | 7/1996 | Baker | ................ | F16H 57/022 74/397 |
| 5,685,944 A * | 11/1997 | Nose | ................ | B65H 37/007 156/540 |
| 5,884,599 A * | 3/1999 | Shiozaki | ................. | F02B 61/02 123/192.2 |
| 5,985,071 A * | 11/1999 | Wynne | ................ | B32B 37/206 156/166 |
| 6,109,129 A * | 8/2000 | Genter | ................ | F16H 55/18 74/397 |
| 6,997,077 B2 * | 2/2006 | Kollmann | ............... | F16H 55/06 29/893.1 |
| 7,296,553 B2 * | 11/2007 | Osman | .................... | F02B 75/06 123/192.2 |
| 7,455,471 B2 * | 11/2008 | Gawehn | ............... | F16B 5/025 16/2.1 |
| 7,530,281 B2 * | 5/2009 | Kratochwill | ............ | F16H 57/12 74/401 |
| 7,658,124 B2 * | 2/2010 | Brosowske | ............... | F01L 1/02 74/409 |
| 8,225,689 B2 * | 7/2012 | Brosowske | ............... | F01L 1/02 74/397 |
| 8,276,859 B1 * | 10/2012 | Caddell | .................... | F16M 7/00 248/188.4 |
| 8,555,744 B2 * | 10/2013 | Hirooka | .................... | B25J 9/103 74/409 |
| 2008/0048090 A1 * | 2/2008 | Hirooka | ............... | B25J 9/103 248/664 |
| 2010/0275709 A1 * | 11/2010 | Vandewal | ............... | F16H 57/12 74/409 |
| 2011/0247581 A1 * | 10/2011 | Trieschmann | .......... | C22C 37/04 123/192.2 |
| 2015/0176698 A1 * | 6/2015 | Vandewal | ............ | F16H 57/022 74/396 |
| 2016/0146327 A1 * | 5/2016 | Fors | ....................... | F16H 57/022 74/409 |

* cited by examiner

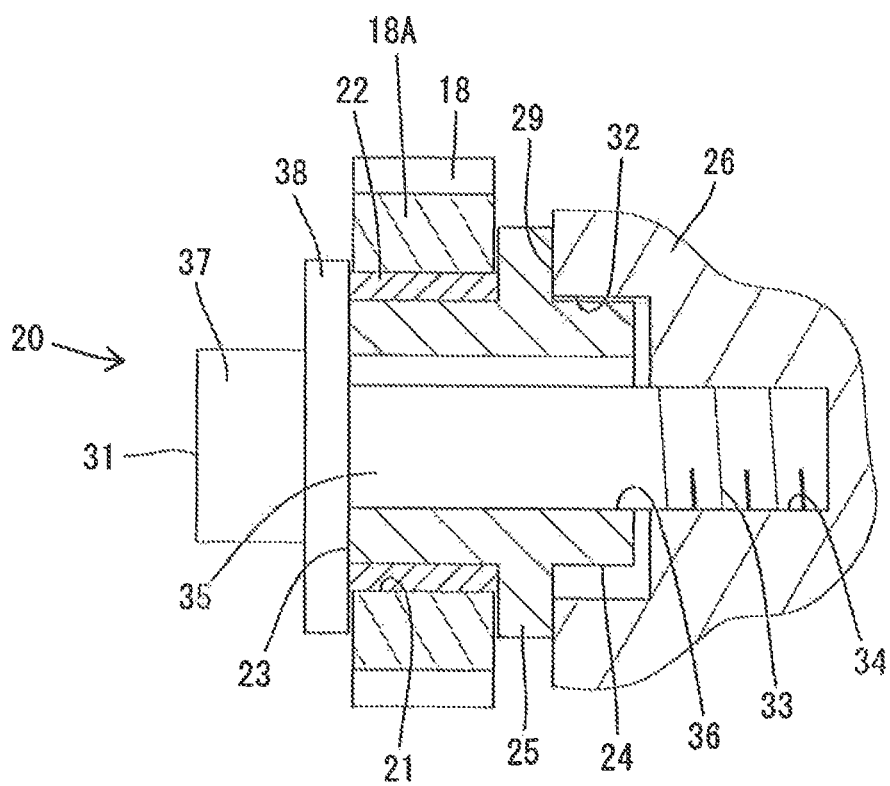

BACKLASH ADJUSTING METHOD AND GEAR MECHANISM

CROSS-REFERENCE TO RELATED APPLICATIONS

This application is based upon and claims the benefit of priority from the prior Japanese Patent Application No. 2013-119619 filed on Jun. 6, 2013, the entire contents of which are incorporated herein by reference.

BACKGROUND

1. Technical Field

The present invention relates to a method of adjusting backlash and a gear mechanism constructed by the backlash adjusting method.

2. Related Art

A balancer has been conventionally known which includes a balance shaft having a driven gear capable of meshing with a driving gear of a crankshaft. A gear ratio of the driving gear to the driven gear is set to, for example, 2:1 in the balancer of this type. Accordingly, the balancer is driven at a rotating speed twice as high as a rotating speed of an engine. This easily causes noise due to backlash, such as rattling noise or meshing noise, and the noise cannot be ignored.

In view of the foregoing noise, for example, a selective fitting procedure is employed for selective assembly of gears. In the selective fitting procedure, gears are selected so that backlash falls within a predetermined dimensional tolerance on the basis of measurement of an over ball diameter (OBD). In this case, however, gears need to be ranked with respect to dimensional tolerance, and the ranked gears need to be prepared as stock. Thus, a problem occurs that stock control is troublesome. Furthermore, since gears belonging to a designated rank need to be selected and assembled, a selection work becomes complicated, resulting in an increase in cost.

On the other hand, for example, gears are coated with resin and can be assembled so that backlash becomes substantially zero with removal of resin coating. In this case, however, since gears need to be coated with resin, a problem also occurs that resin coating increases cost in the same manner as described above.

SUMMARY

Therefore, an object of the invention is to provide a gear mechanism which can adjust backlash in an easy manner.

The present invention provides a gear mechanism including a first gear and a second gear spaced away from each other, an idler gear meshing engageable with the first and second gears with a gap according to a thickness of a film and a mover/stopper capable of moving the idler gear in a radial direction perpendicular to axial directions of the first and second gears toward a meshing engagement position where the idler gear is meshing engageable with the first and second gears. The mover/stopper is also capable of stopping the idler gear at the meshing engagement position. In the above-described gear mechanism, the idler gear has an inner circumference with a centrally located inner space and an outer circumference rotatable relative to the inner circumference. The mover/stopper includes a single bolt inserted through the inner space in a loosely fitted state and having a shaft part capable of assuming different radial positions relative to the inner space, and a receiving part holding the idler gear via the bolt. The idler gear and the bolt are configured such that the idler gear is allowed to be radially displaced relative to the bolt and to be tightened to the receiving part at the meshing engagement position by the bolt to thereby be radially fixed and such that the inner circumference of the idler gear is allowed to be axially held between the receiving part and the bolt to be fixed.

In the above-described gear mechanism, the mover/stopper is provided which is capable of radially moving the idler gear toward the meshing engagement position and stopping the idler gear. Consequently, the idler gear can be smoothly pressed against the first and second gears by the mover/stopper. In particular, costs can be reduced since only the mover/stopper is added as a new component to the existing idler gear.

BRIEF DESCRIPTION OF THE DRAWINGS

In the accompanying drawings:

FIG. 4 schematically illustrates the state where the idler gear is stopped at a mesh engagement position by the mover/stopper.

DETAILED DESCRIPTION

Embodiment 1 of the present invention will be described with reference to FIGS. 1 to 4 of the accompanying drawings. A gear mechanism of embodiment 1 is applied to a balance shaft 10 of a reciprocating engine for use in automobiles.

Figure 2:
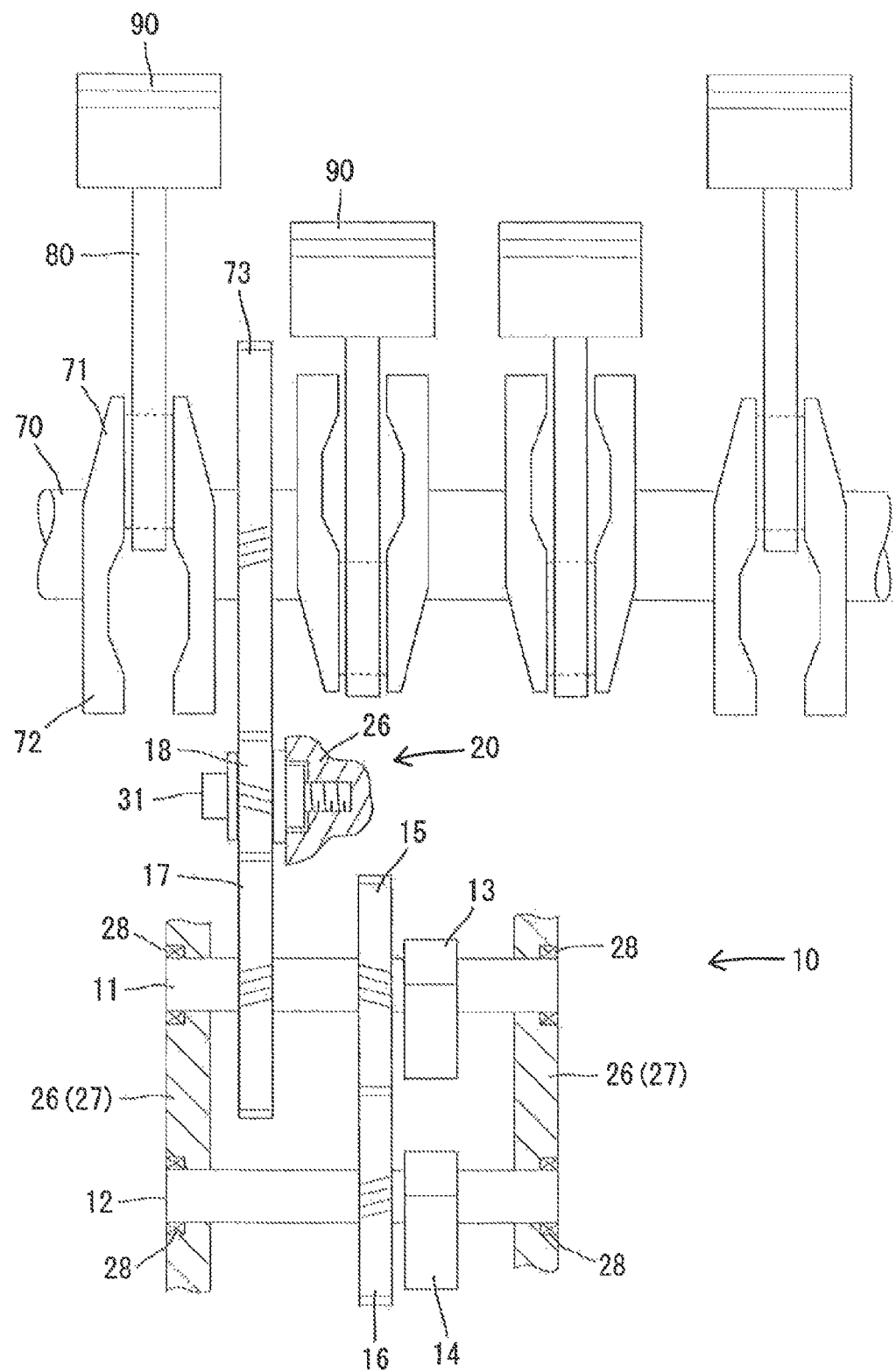
FIG. 2 schematically illustrates the state where power is transmitted from a crankshaft via a gear mechanism to balance shaft.

Referring to FIG. 2, the reciprocating engine is an in-line four-cylinder engine and is operated so that two inner pistons 90 are located at respective bottom dead points when two outer pistons 90 are located at respective top dead points. The pistons 90 are connected via con rods 80 to crank arms 71 of a crankshaft 70 respectively. The crank arms 71 are provided with counter weights 72 located opposite connections to the con rods 80, respectively. A first gear 73 is mounted on the crankshaft 70 so as to be located between the outermost piston 90 and the piston 90 located inside the outermost piston 90.

The balance shaft 10 includes two shafts 11 and 12 driven by the crankshaft 70 thereby to be rotated, two generally semicircular masses 13 and 14 eccentrically mounted on the shafts 11 and 12 respectively, driven gears 15 and 16 mounted on the shafts 11 and 12 respectively and mesh engageable with each other, a second gear 17 mounted on the shaft 11 and located opposite and spaced away from the first gear 73, and an idler gear 18 mesh engageable with the first and second gears 73 and 17. The shafts 11 and 12 are disposed in parallel with each other. A cylinder block 26 has a wall 27 on which the shafts 11 and 12 are rotatably supported via respective bearings 28. The balance shaft 10 is provided in an oil pan (not shown) constituting a lower part of the cylinder block 26.

The number of teeth of the second gear 17 is one-half of the number of teeth of the first gear 73. Both driven gears 15 and 16 have the same number of teeth.

When the crankshaft 70 is rotated in conjunction with a reciprocal movement of the piston 90, the rotative force of the crankshaft 70 is transmitted to both shafts 11 and 12 through the first gear 73, the idler gear 18 and the second gear 17. In this case, the shafts 11 and 12 are rotated at twice the speed of the crankshaft 70. The shafts 11 and 12 are rotated at the same speed in opposite directions. The shafts 11 and 12 are provided with respective masses 13 and 14 which suppress up-down oscillation or vibration of the shafts 11 and 12 resulting from the secondary inertia force of the reciprocatory piston 90 and also cancel oscillation or vibration produced between the shafts 11 and 12.

In embodiment 1, a gap (backlash) according to the thickness of the film 60 is ensured between teeth of the idler gear 18 and teeth of the first gear 73 in meshing engagement with the teeth of the idler gear 18 and between the teeth of the idler gear 18 and teeth of the second gear 17 in meshing engagement with the teeth of the idler gear 18.

The idler gear 18 is moved in a radial direction by a mover/stopper 20 so as to come close to and to depart from the first and second gears 73 and 17 spaced apart from each other. The radial direction is perpendicular to an axial direction (the direction of a central axis of rotation) of the idler gear 18. As a result, the idler gear 18 is moved between a meshing engagement position where the idler gear 18 is properly meshing engageable with the first and second gears 73 and 17 and a non-meshing engagement position where the idler gear 18 is unable to properly meshing engage with the first and second gears 73 and 17. When located at the meshing engagement position, the idler gear 18 is meshing engageable with the first and second gears 73 and 17 with the film 60 being held therebetween. The mover/stopper 20 will be described in detail later.

Figure 1:
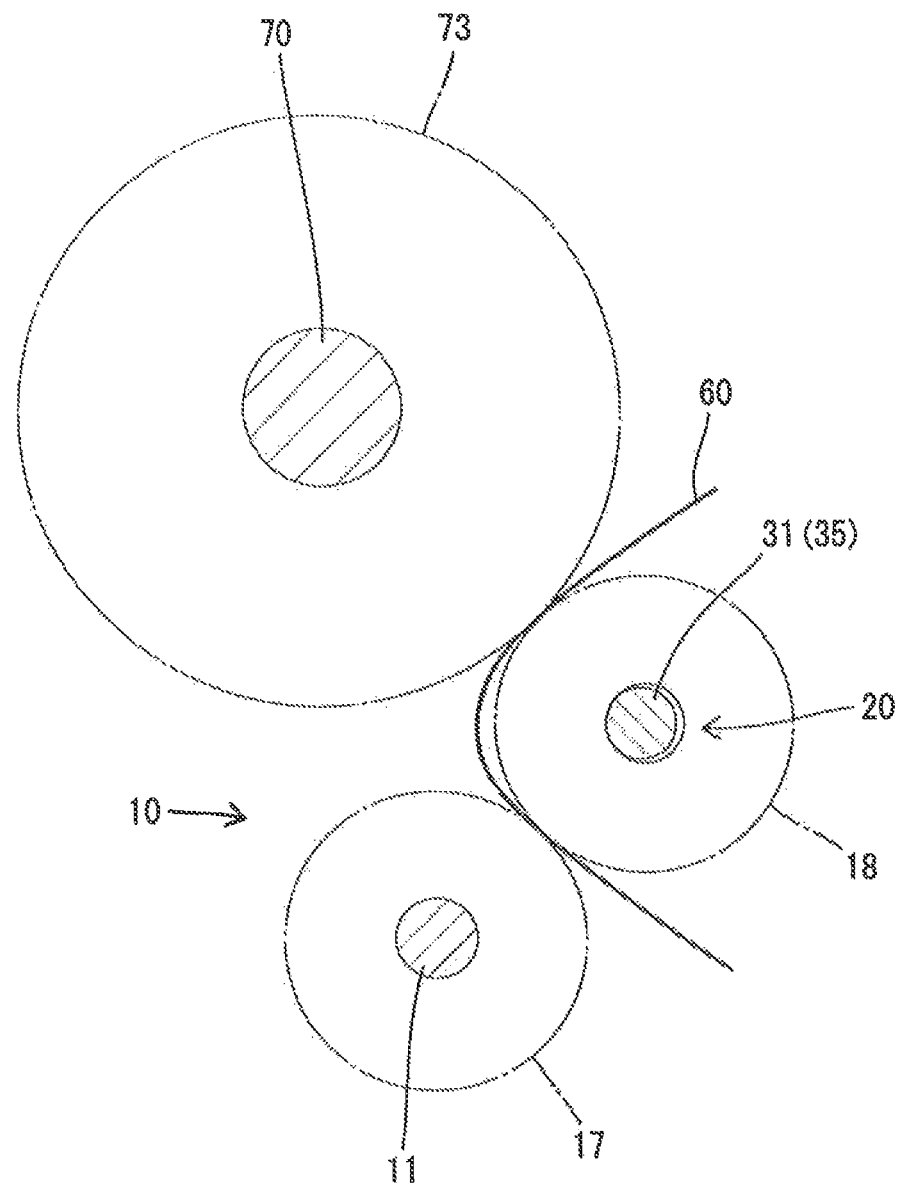
FIG. 1 schematically illustrates the state where an idler gear is pressed against first and second gears with a film being held therebetween, showing a first embodiment.

The film 60 is pressed by the idler gear 18 thereby to be held between the idler gear 18 and the first and second gears 73 and 17 with movement of the idler gear 18 from the non meshing engagement position to the meshing engagement position, as shown in FIG. 1. As a result, the film 60 is deformed so as to be rendered concavo-convex repeatedly circumferentially along the surfaces of teeth of the gears 17, 18 and 73. The film 60 is removed from between the gears 17, 18 and 73 after the idler gear 18 has been led to the meshing engagement position. After removal of the film 60, gaps (backlash) are defined between the teeth of the gears 73 and 18 and between the teeth of the gears 17 and 18 according to the thickness of the film 60.

The film 60 is preferably at least one resin selected from a group consisting of polyester (PET), polycarbonate (PC), oriented polypropylene (OPP), polyethylene (PE), triacetate (TAC) and polyimide (PI). When made from at least one of the foregoing resins, the film 60 is rich in flexibility and is flexibly deformable along the teeth of the gears 17, 18 and 73.

Polyester is used as the resin of the film 60 in embodiment 1 since the polyester has a predetermined strength and a cost advantage. Furthermore, since the film 60 adheres to circumferentially paired tooth surfaces of the gears 17, 18 and 73, the thickness of the film 60 is set at one-half of a target backlash. More specifically, the thickness of the film 60 is set in the range from 0.02 to 0.05 mm.

Figure 3:
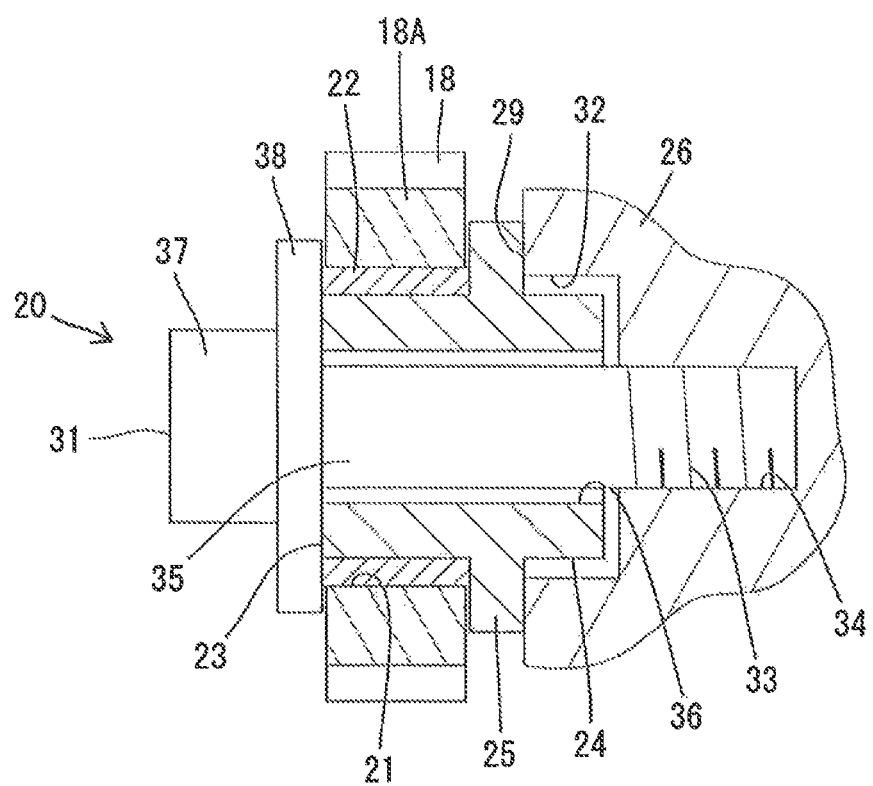
FIG. 3 schematically illustrates the state where the idler gear is stopped at a non-mesh engagement position by a mover/stopper of the gear mechanism.

The mover/stopper 20 will now be described. The mover/stopper 20 is capable of moving the idler gear 18 from the non-meshing engagement position to the meshing engagement position and capable of stopping the idler gear 18 at the non-meshing engagement position and at the meshing engagement position. The idler gear 18 includes an outer circumference 18A formed with a centrally located through hole 21, a cylindrical bush 22 fitted inside the through hole 21 and serving as a slide bearing, and a displacement cylinder 23 fitted inside the bush 22 and radially displaceable, as shown in FIG. 3. The bush 22 and the displacement cylinder 23 are constituted into an inner circumference rotatable relative to the outer circumference 18A. The displacement cylinder 23 has an outer circumferential surface formed with a protruding edge 25 which protrudes radially at a position near a distal end 24 thereof protruding from the through hole 21. The protruding edge 25 is formed over an entire circumference of the displacement cylinder 23.

On the other hand, the idler gear 18 is disposed to face a wall surface 29 of the cylinder block 26 (a receiving part) and rotatably held via a bolt 31 (a fixing member) and the bush 22 on the cylinder block 26, as shown in FIG. 3. The wall surface 29 is formed with a recess 32 into which the distal end 24 of the displacement cylinder 23 is inserted. The recess 32 has a threaded hole 34 which is open in the central inner surface thereof and axially extends. The bolt 31 has a threaded part 33 which is threadingly engageable with the threaded hole 34. The bolt 31 has a shank 35 inserted into an inner space 36 inside the displacement cylinder 23 in a loosely fitted state, except for the threaded part 33 formed at the distal end side of the shank 35, whereby the displacement cylinder 23 is capable of radial displacement relative to bolt shank 35 within the inner space 36. Furthermore, the distal end 24 of the displacement cylinder 23 is also capable of radial displacement relative to the cylinder block 26 in the recess 32. On the other hand, since the threaded part 33 is threadingly engaged with the threaded hole 34 of the cylinder block 26, the bolt 31 is prevented from radial displacement relative to the cylinder block 26, whereby the bolt 31 is radially fixed relative to the cylinder block 26.

The bush 22 has one end facing an axial surface of the idler gear 18 (a surface at the head 37 side of the bolt 31), as shown in FIG. 3. A flange 38 formed to project from the head 37 is in abutment with the aforesaid end of the bush 22 in the state where the threaded part 33 is in threading engagement with the threaded hole 34. Furthermore, the bush 22 has the other end facing the other axial surface of the idler gear 18 (the surface opposed to the wall surface 29 of the cylinder block 26). The protruding edge 25 of the displacement cylinder 23 is disposed in abutment with the other end of the bush 22. Additionally, the protruding edge 25 has a surface which is located opposite the surface in abutment with the bush 22 and which is disposed in abutment with the wall surface 29 of the cylinder block 26. Thus, the protruding edge 25 is axially held between the bush 22 and the wall surface 29 of the cylinder block 26. As a result, the protruding edge 25 and the bush 22 are axially held between the flange 38 of the bolt 31 and the wall surface 29 of the cylinder block 26.

The following will describe the operation of the mover/stopper 20 and the backlash adjusting method. When the idler gear 18 is located at the non-meshing engagement position, for example, the shank 35 of the bolt 31 is disposed substantially in the central part of the inner space 36 of the idler gear 18 and the distal end 24 of the displacement cylinder 23 is disposed substantially in the central part of the recess 32 of the cylinder block 26, as shown in FIG. 3. When the threaded part 33 is threadingly engaged with the threaded hole 34 in this state, the bush 22 is held between the flange 38 of the bolt 31 and protruding edge 25 of the displacement cylinder 23 to be fixed. In this case, the idler gear 18 is spaced away from the first and second gears 73 and 17, and the film 60 is inserted into the space therebetween. The non-meshing engagement position in this case refers to any position where the film 60 is insertable into the space between the idler gear 18 and the first and second gears 73 and 17, except for the meshing engagement position, but is not determined to be a single position.

Subsequently, the bolt 31 is loosened to release the bush 22 from the fixed state. In this condition, the idler gear 18 is radially displaced relative to the bolt 31 and the cylinder block 26 to be led to the meshing engagement position. When the idler gear 18 reaches the meshing engagement position, the shank 35 of the bolt 31 is eccentrically located at one radial end side in the inner space 36 of the idler gear 18, and the distal end 24 of the displacement cylinder 23 is eccentrically located at the other radial end side in the recess 32 of the cylinder block 26, for example, as shown in FIG. 4. The threaded part 33 is threadingly engaged with the threaded hole 34 in this condition, with the result that the bush 22 is held between the flange 33 of the bolt 31 and the protruding edge 25 of the displacement cylinder 23 thereby to be fixed in position. In other words, the bush 22 and the protruding edge 25 are held between the flange 38 of the bolt 31 and the wall surface 29 of the cylinder block 26 to be fixed. Furthermore, when the idler gear 18 is led to the meshing engagement position, the film 60 is pressingly moved by the idler gear 18 to be held between the first and second gears 73 and 17 and the idler gear 18, whereby the film 60 is deformed between the first and second gears 73 and 17 and the idler gear 18, as shown in FIG. 1. When the film 60 is removed thereafter, the predetermined backlash is ensured between the gears 73 and 18 and between the gears 17 and 18 according to the thickness of the film 60.

According to the above-described embodiment 1, the idler gear 18 is pressed against the first and second gears 73 and 17 with the flexible film 60 being held therebetween. When the film 60 is then removed, a gear mechanism with a gap according to the thickness of the film 60 being ensured can be easily constructed. Furthermore, costs can be reduced since only the mover/stopper 20 is added as a new component to the existing idler gear 18 in embodiment 1.

Furthermore, the gear mechanism is provided with the mover/stopper 20 which can radially more the idler gear 18 toward the meshing engagement position and stop the idler gear 18. Accordingly, the pressing of the idler gear 18 against the first and second gears 73 and 17 can be carried out smoothly and reliably by the mover/stopper 20.

Moreover, the gear mechanism displaces the idler gear 18 in an allowable range of relative displacement of the bolt 31, thereby leading the idler gear 18 to the meshing engagement position. In this condition, the bolt 31 is tightened against the cylinder block 26 thereby to be fixed with the result that the idler gear 18 is stably held via the bolt 31 on the cylinder block 26.

The invention should not be limited to the foregoing embodiment and may be modified as follows.

1. Contrary to the foregoing embodiment, when the idler gear is located at the meshing engagement position, the bolt shank may be disposed substantially in the central part of the inner space of the idler gear, and the distal end of the displacement cylinder may be disposed substantially in the central part of the recess of the cylinder block. When the idler gear is located at the non-meshing engagement position, the bolt shank may be eccentrically disposed at one radial end side in the inner space of the idler gear and the distal end of the displacement cylinder may be eccentrically disposed at the other radial end side in the recess of the cylinder block.

2. The mover/stopper may not be provided with means for stopping the idler gear at the non-meshing engagement position.

3. The mover/stopper may have a guide structure which guides the idler gear toward the meshing engagement position.

4. The gear mechanism in accordance with the invention may be applied to various gear mechanisms of the power transmission system of the automobile as well as the above-described balance shaft.

What is claimed is:

1. A gear mechanism comprising:
a first gear and a second gear spaced away from each other;
an idler gear meshing engageable with the first and second gears with a gap; and
a mover/stopper capable of moving the idler gear in a radial direction perpendicular to axial directions of the first and second gears toward a meshing engagement position where the idler gear is meshing engageable with the first and second gears, the mover/stopper being also capable of stopping the idler gear at the meshing engagement position, wherein:
the mover/stopper includes a single bolt having a shaft part and a receiving part holding the idler gear via the bolt;
the idler gear has an inner circumference and an outer circumference rotatable relative to the inner circumference, the inner circumference having a displacement cylinder through which the shaft part of the bolt is loosely inserted and which is allowed to be radially displaced relative to the shaft part of the bolt in a range of a gap between the shaft part of the bolt and the displacement cylinder, the displacement cylinder having an outer peripheral surface formed with a protruding edge located near a distal end of the displacement cylinder and protruding radially;
the receiving part of the mover/stopper has a wall surface formed with a recess into which the distal end of the displacement cylinder is inserted so as to be radially displaceable, the recess having an inner surface in which a threaded hole threadingly engageable with the shaft part is open; and
when the shaft part is threadingly engaged with the threaded hole and is tightened, the protruding edge of the displacement cylinder abuts against an open peripheral edge of the recess in the wall surface of the receiving part to thereby be held.

2. The gear mechanism according to claim 1, wherein:
the inner circumference of the idler gear has a bush fitted with an inside of the outer circumference of the idler gear, and the bolt is formed with a flange projecting radially; and
when the shaft part is threadingly engaged with the threaded hole and is tightened, the protruding edge of the displacement cylinder and the bush are axially held between the flange and the wall surface of the receiving part thereby to be fixed.

3. The gear mechanism of claim 2, wherein the flange and shaft part share a common central axis.

4. The gear mechanism of claim 2, wherein the flange is a unitary part of the bolt.

5. The gear mechanism of claim 2, wherein the flange is in compression contact with each of the bush and the displacement cylinder when the shaft part is threadingly engaged with the threaded hole and is tightened.

6. The gear mechanism of claim 2, wherein the flange extends radially out over the entirety of the inner circumference of the idler gear and at least a portion of the outer circumference of the idler gear, while avoiding compression contact with the outer circumference.

7. The gear mechanism of claim 2, wherein the bush is a slide bearing fitted inside the outer circumference of the idler gear and has two axial ends; and wherein when the shaft part is threadingly engaged with the threaded hole and is tightened, one of the axial ends of the bush abuts against the protruding edge and the other axial end of the bush abuts against the flange, whereby the bush is held between the protruding edge and the flange and is fixed.

8. The gear mechanism according to claim 1, which is applied to a balance shaft of a reciprocating engine of an automobile, wherein:

the receiving part is a cylinder block;

the first gear is provided on a crankshaft; and the second gear is provided on a shaft which is driven by the crankshaft to be rotated and provided with a mass.

9. The gear mechanism of claim 1, wherein the mover/stopper is capable of moving the idler gear in a radial, straight line direction perpendicular to axial directions of the first and second gears toward the meshing engagement position, and the idler gear and the bolt are configured such that the idler gear is allowed to be radially displaced in a straight line direction relative to the bolt to be tightened to the receiving part at the meshing engagement position by the bolt to thereby be radially fixed.

10. The gear mechanism of claim 1, wherein the distal end of the displacement cylinder is free of contact relative to the receiving part.

11. The gear mechanism of claim 1, wherein the gap is defined by a thickness of a film.

* * * * *